Sept. 13, 1960

C. W. LYTLE 2,952,771

TUNERS FOR RADIO AND TELEVISION RECEIVERS, AND THE LIKE

Filed July 2, 1952

5 Sheets-Sheet 1

Inventor:
Chester W. Lytle,
by [signature]
Att'y.

Inventor:
Chester W. Lytle,
by [signature] Atty.

Sept. 13, 1960 C. W. LYTLE 2,952,771

TUNERS FOR RADIO AND TELEVISION RECEIVERS, AND THE LIKE

Filed July 2, 1952 5 Sheets-Sheet 3

Inventor:
Chester W. Lytle:
by [signature] Att'y.

Note: The air-gaps between proximate faces of rotor and stator elements of each Variable inductance are approximately 0.03575 inch in thickness.

Inventor,
Chester W. Lytle,
by [signature] Atty.

Sept. 13, 1960

C. W. LYTLE

TUNERS FOR RADIO AND TELEVISION RECEIVERS, AND THE LIKE 2,952,771

Filed July 2, 1952

5 Sheets-Sheet 5

Note: Indicated Capacitor values are stated in micro-microfarads.

Inventor:
Chester W. Lytle,
by [signature] Att'y.

2,952,771

TUNERS FOR RADIO AND TELEVISION RECEIVERS, AND THE LIKE

Chester W. Lytle, Chicago, Ill., assignor to Lytle Corporation, Chicago, Ill., a corporation of Illinois Filed July 2, 1952, Ser. No. 296,821
3 Claims. (Cl. 250—20)

This invention relates to improvements in tuners for radio and television receivers. The invention relates more specifically to improvements in receivers intended for very high frequency reception, but it will appear that the present improvements are not limited to use in connection with very high frequency reception, but may also be usefully applied in connection with tuners for other frequencies, either lower or higher than those now generally referred to as within the "very high" frequency range. However, since the present improvements have been devised especially to meet the design and construction of tuners intended for the "very high" frequency range, that range will generally be referred to hereinafter, but without any intention to limit the use and application of the present disclosures to tuners intended for use in that particular range, except as such limitations may be imposed by the claims to follow.

A principal feature and object of the present invention relates to improvements by the use of which it is possible to secure "straight-line" or "linear" tuning, within such ranges as between, say, 108 and 126 megacycles, the various tuning elements and circuits of the tuner being so designed, and so related to each other that this result may be secured within the general range of frequencies mentioned above, for example. In this connection it is a further feature and object of the invention to provide a tuner which uses variable impedance elements of the type wherein variable inductances are employed. In this connection it is here mentioned that when tuning in the very high frequency range (such as any range wherein the frequencies are of the order of a hundred megacycles, or thereabout, or many hundred megacycles), the various circuit elements, and the various connections between circuit elements, must be of such design and shortness and compactness as to reduce their impedance values to very low figures. The variable impedance elements are also of low impedance values, and operate through small ranges of such values.

The tuners herein disclosed incorporate variable impedance elements of the vane stator and rotor type—that is, the type in which stationary stator vanes are connected into the circuits, and in which the impedances of these stator elements are varied by movable rotors moving in proximity to these stationary vanes. Preferably, also, the present tuners include variable impedances in which said impedances are inductances. In this type of variable impedance it is not necessary to electrically connect the movable elements (rotors) to the circuits, since the variations of impedance are produced by electro-static effects, the rotors being insulated from other circuit elements, and thus not requiring slip or other like contacts or connections whose resistances are of uncertain and generally variable amount. Other benefits flowing from the use of stator-vane-rotor type variable impedances in the present tuners will also hereinafter appear.

One such other benefit flowing from the use of stator-vane-rotor type variable impedances in tuners for use in the very high frequency ranges is directly related to the production of tuners in which the tuning movements are linear, that is, in which the scale spacings between successive equal frequency variations, are equal. This condition may be secured in the present tuners by proper design of the stator vanes, and proper correlated design of the rotors, as will hereinafter appear. At this point another object and benefit of the present improvements is disclosed, as follows:

An important feature and object of the invention relates to the production of a design and construction of very high frequency tuners of what may be called a standardized or line assembly type. This feature relates to the provision of arrangements such that the scales of all the tuners of a specified range and other specifications may be produced alike, and with equal spacings between the successive frequency reading positions, thus greatly simplifying the production of these scales, and greatly reducing their cost of manufacture. The tuner arrangements are then such that when the various tuner elements, including the scales, have been assembled together, the tuner circuits and the necessary tuning elements, may be readily calibrated and adjusted so that the reading positions of the pointer which travels across or along the indicating scale will exactly and correctly indicate the frequencies to which the tuner is tuned at the scale positions. That is to say, the arrangement is one in which the tuner circuits and impedance elements are calibrated to the scale, as distinguished from an arrangement in which the scale is calibrated to the actual tuned frequencies. By attaining this objective it is thus made possible to produce the scales of a standardized design and by quantity production methods of manufacture, and at low cost, since it is thus made unnecessary to actually test each assembled tuner and then specially mark its scale to give the correct frequency indications corresponding to various pointer positions.

This ability to make use of standardized scales is also related to the provision of variable impedance elements of a type and design such that linear variations of impedance values may be secured by such variable impedances. That this is true will be evident from the following:

When the variable impedances are of such design that equal physical movements of the movable element produce equal changes of tuned frequency in the delivered signals it is evident that, prior to calibration, the actual signal frequencies tuned for various pointer positions will either, first, correctly correspond to the pointer positions through the full range of tuned frequencies; or second, the total movement of the pointer along the scale will produce a total difference of readings equal to the total change in actual tuned frequency, but each of the pointer readings will be either too high or too low by the amount of inexactness or error prior to calibration; or third, the total range of actual tuned frequencies will be greater or less than the difference between the high and low pointer indications so that, although the pointer may read correctly at some single position, it will read either too high or too low for all other frequencies tuned, the amounts of excess or deficiency in such readings becoming progressively and arithmetically greater as the value of the actual tuned frequency is progressively raised or lowered further and further from the single correct frequency reading position. In the first, but exceptional condition, the "spread" of the actual tuned range is the same as the spread of pointer movement along the scale, and also there exists correct registry between the pointer readings and the actual tuned frequencies; no calibration change is required. In the second condition, the "spread" of the actual tuned range is the same as the spread of pointer movement along the scale, but there exists a uniformly equal amount of error in the pointer readings, either they are too high or they are too low by a given and unchangeable amount over the entire range; calibration must be produced by a bodily shift of the pointer positions with respect to the scale, or vice versa so as to correct for such amount of error, but no change of "spread" of the actual tuned frequency is needed. In the third condition, the "spread" of the actual tuned range, corresponding to a given amount of movement of the pointer along the scale, is different from the difference between the high and low pointer readings—the "spread" of the actual tuned range is different from the spread of the pointer readings—the pointer movement. Under these conditions there may or there may not be one single tuned frequency at which the pointer will read correctly, depending on whether or not the characteristic curves or lines for actual tuned frequency and for pointer reading cross each other within the range of tuned frequencies which is possible.

Characteristic curves plotted between pointer position and frequency for the foregoing conditions will further aid in understanding the relationship of the conditions above explained. In the case of the characteristic curve for the pointer movement we will have a straight line slanting upwardly to higher scale readings and correspondingly higher frequency tunings. This may be considered as the "Ideal" calibration condition, since it is the actual scale reading for each pointer position, and we desire to bring the actual tuned frequencies into correspondence with these readings. Compared with this "ideal" calibration line, the characteristic line for the "first" condition will be one which overlies the ideal line, since the actual frequencies are correctly shown by pointer positions over the entire range of pointer movements. On the contrary, the characteristic line for the "second" condition will be one which is parallel to the ideal line, but will lie either above or below the ideal line, depending on whether the actual tuned frequency is higher than or less than the pointer reading for each tuned position. Correction in this case may be effected by changing the tuning elements and circuits in such manner as to either increase or reduce the actual frequency which will be tuned for any position of the pointer with respect to the scale, doing this in such manner that the change of actual tuned frequency will be the same for all positions along the scale—that is, effecting this change without changing the spread. By such change or changes as just indicated the characteristic line will be either raised or lowered until it is brought into registry with the ideal line.

In the case of the characteristic line for the third condition the "spread" of the actual tuned frequencies corresponding to a given change of the pointer position will be either greater than or less than the difference between the two pointer readings depending on whether the rate of change of actual tuned frequency is greater than or less than the rate of change of the pointer readings. In this case the slant of the characteristic line for the actual tuned frequency will be different from the slant of the characteristic line of the pointer movements; it will be greater than the characteristic line for the pointer movements when the rate of change of actual tuning is greater than the rate of change of the pointer readings, and will be less than the characteristic line for the pointer movements when the rate of change of the actual tuned frequency is less than the characteristic line for the pointer movements. In either of these cases the characteristic line for the actual tuned frequency would intersect the characteristic line for the pointer movements, or the projections of these two lines would intersect at some point beyond the intended tuning range. It will be evident, however, that in this "third" condition provision must be made for effecting two kinds of corrections of the characteristic line of actual tuning frequency; the slant of that line must be corrected to approximate or even to be exactly the same as the slant of the ideal line, and the elevation of the characteristic line of actual tuned frequency must be either raised or lowered at one end to bring it to registery with the elevation of the characteristic line of pointer movements.

All of the foregoing statements as to corrections to be effected in the tuning elements and circuits are based on the assumption that the spacings of the scale readings are not changed, and the further assumption that said scale is not changed as to its position, and that the pointer movements are not changed with respect to the movements of the movable elements of any variable impedance elements which are physically connected to the pointer itself. In other words, these assumptions are made on the premise that the actual tuned frequencies are to be brought into harmony with the previously set and adopted scale and its pointer. A principal feature and object of the present invention relates to the provision of such circuit elements and connections as to make possible the attainment of the above calibration effects; and more specifically, said calibration effects in tuners intended for tuning in the very high frequency ranges previously referred to herein.

The variations of impedance values which occur in the variable impedance elements connected to the movable pointer depend on the forms or shapes of the stator and rotor elements of said variable impedances. These elements are so designed as to produce the linear variations of actual tuned frequencies which are desired, and to so relate such linear variations to the pointer positions for various tuning indications as to ensure close readings of the pointer on the scale. However, even with close tolerances in manufacture and assembly of the tuner elements it will generally be found that there are some errors or departures of the pointer readings from the actual tuned frequencies, so that corrections are needed in order to bring the assembled tuner into very accurate reading condition. These final corrections are made by slight changes or adjustments of normally fixed value inductances and capacitances. These "shop" adjustments may be readily made, in order to bring the assembled tuner into correct reading condition over its entire scale or intended range. These final or calibration adjustments may be made by a simple series of empirical tests and corresponding adjustments, and will remain unchanged unless intentionally changed for some special purpose. It is a purpose and object of the present invention to so arrange the circuits and the circuit elements that these calibration adjustments may be very simply and accurately effected in a short time, and by few operations of simple nature.

The calibration adjustments referred to in the preceding paragraph are produced in the oscillator circuits. In order to ensure the most perfect matching of the R. F. amplifier and mixer circuits provision is also made for producing slight shop adjustments of these circuits, with empirical tests, so that the entire tuner element may be brought to the most perfect overall condition in simple manner.

Although the stator and rotor elements of the variable impedance elements are designed to secure linear changes of the actual tuned frequencies, it may sometimes happen that slight departures from exact lineality are found when the tuner is assembled. These may be corrected by slight adjustments of the spacings of the stator elements of the variable impedance elements from the rotors thereof. Such adjustments may be readily made by slight flexings of the stator elements; but to ensure that these adjustments will remain exactly as made it is found desirable to provide good and permanent mountings and supports for said stator elements. In the present disclosures these stator elements are retained in fixed positions by a three point support arrangement, with supports at top and bottom, and at one side of each stator vane, so that when said vanes are slightly bent or flexed between such points of support they will retain their adjusted forms with certainty. In this connection, also, each rotor element preferably operates between two of the stator elements which are connected in series or other desired circuit arrangement. If desired the slight adjustments may be made by slight flexing of the rotors, or, in case of slight tolerances in the setting of the rotors on the shaft which carries them it may be found that each rotor is not exactly centrally positioned between the two stator vanes which it serves. Such slight inaccuracies of placement, however, will not materially affect the final calibration effects, since a slight displacement of a rotor to one side, with consequent increase of air gap between such rotor and one stator will be accompanied by a corresponding slight decrease of the air gap between such rotor and the other stator which it influences.

In order to eliminate any errors of movement of the pointer with respect to the variable impedance rotor movements, due to back-lash in the gearing which is interposed in the connections between these parts provision is made for complete elimination of such back-lash effects by use of gears which are held at all times in complete back-lash elimination condition. To a like effect and for a like purpose provision is also made for maintaining the cords which connect the pointer with the rotor shaft elements under continuous stress so that the proper relationship between the parts will be maintained at all times.

The variable impedance elements for the R. F. amplifier, for the mixer, and for the oscillator are all located in axial alignment and with their rotors all carried by a common shaft which is connected to the pointer. By this means all of said circuits are simultaneously tuned in proper relationship. In order to eliminate as completely as possible any cross-coupling between these circuits the tuner is provided with shields between these successive variable impedance elements, which shields are effectively grounded, each one at several points around the rotor shaft so as to ensure the most effective and most perfect shielding effect possible.

Other objects and uses of the present invention will appear from a detailed description of the same which consists in the features of construction and combinations of parts hereinafter described and claimed.

Figure 19:
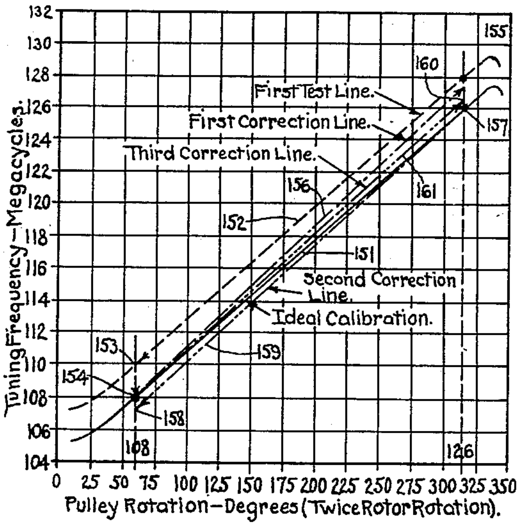
Figures 20, 21:
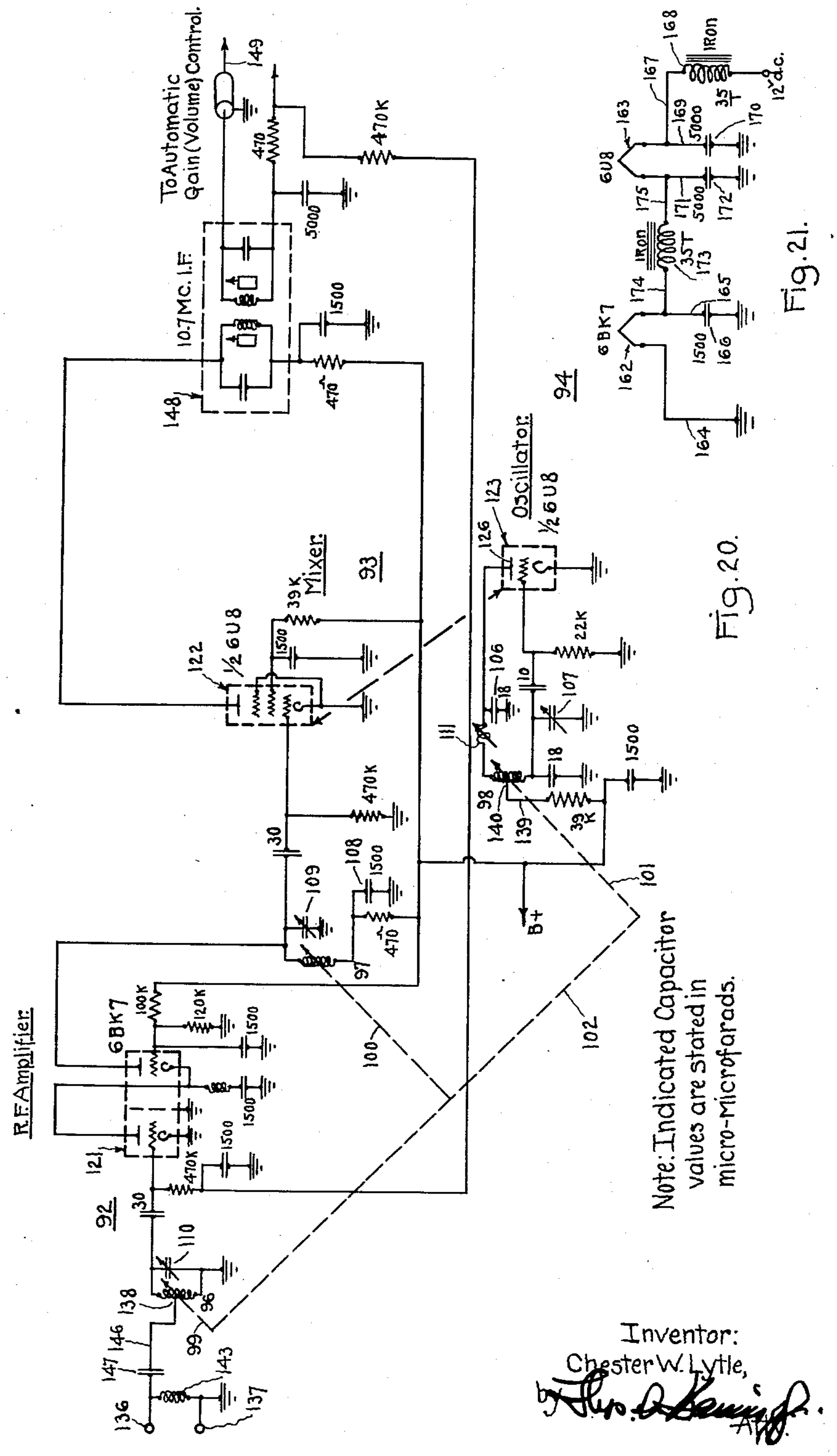

Figure 19 shows a set of characteristic curves and calibration effects for the tuner illustrated in previous figures; and in this figure the "ideal calibration" line shows the scale readings of frequency to which the tuner is to be calibrated; and the other lines shows various actual tuned frequency results and tests secured during a typical calibration operation to secure substantially perfect tuning of the completed unit;

Figure 20 shows a typical wiring diagram of a tuner embodying the features of the present invention; and Figure 21 shows more or less schematically a detail portion of the wiring diagram, supplemental to the showing of Figure 20, and having to do especially with the filament lighting connections, and associated circuit elements, as will presently appear in detail.

In the drawings I have shown a typical tuner embodying the features of my present invention, and which is so designed and constructed that the objectives hereinbefore stated, and others, may be attained. This tuner includes the frame or body element including the front and back vertical plates, 25 and 26 which are connected together by the bar 27 near the upper left-hand corner, the angles 28 and 29 near the upper and lower right-hand corners, and the bar 30 near the lower left-hand corner. These bars and angles may be connected to the front and back plates in any convenient manner for rigid attachment. In the illustrated construction such connections are effected by passing reduced size end lugs of the bars and angles through appropriately sized openings of the front and back plates, and then riveting the parts together in well understood manner. By this means, also, good electrical connections are established between all of the frame parts.

In the frame illustrated in the drawings the bar 30 is provided with end flanges 31 and 32 which are secured to the front and back end plates by screws, in which case this bar, as well as the bar 27 and the two angles 28 and 29, may be also soldered to the front and back plates for improved electrical connection.

A sheet of insulating material, such as Bakelite or other synthetic material, 33 is secured to the lower face of the bar 27 and to the upper face of one leg of the angle 28; a like sheet of insulating material 34 is secured to the right-hand or outer faces of the other leg of the angle 28 and to one leg of the angle 29; and a third, like sheet of insulating material 35 is secured to the other leg of the angle 29 and to the bar 30, although in the illustrated case this last connection (to the bar 30) is not shown. These sheets all extend either the full distance between the front and back plates, or for such distance as to provide supports for various elements presently to be described. Included in these elements so supported by said sheets are the stator vanes of the variable impedance elements, and various of the circuit elements, including various resistances, capacitors, inductances, and other elements. These will be referred to hereinafter.

A shaft 36 extends from front to back of the tuner, being journalled in the front and back plates and projecting slightly through the back plate, and through the front plate far enough to take a driving connection, presently to be described. The journalling in the front plate is shown as being a simple opening 37 in said plate, whereas the journalling in the back plate is shown as comprising the backwardly formed neck 38 of said back plate. An insulating sleeve 39 of suitable material, such as Bakelite, is nicely fitted onto this shaft, and is of length slightly less than the clearance between the front and back plates so that slight endwise adjustments of the shaft and sleeve may be effected during assembly of the parts in order to secure good registry of the rotor vanes with the stator vanes which they influence, and to ensure correct spacings between these parts. The thin disk or shim 40 is shown as set between the back end of this sleeve and the front face of the back plate 26 so as to retain the shaft and sleeve at their intended position endwise of the tuner. In other cases shims of less thickness might be inserted between the two ends of such sleeve and both the front and back plates, to secure the desired endwise adjustment of the shaft and sleeve.

Figures 4, 5, 6:
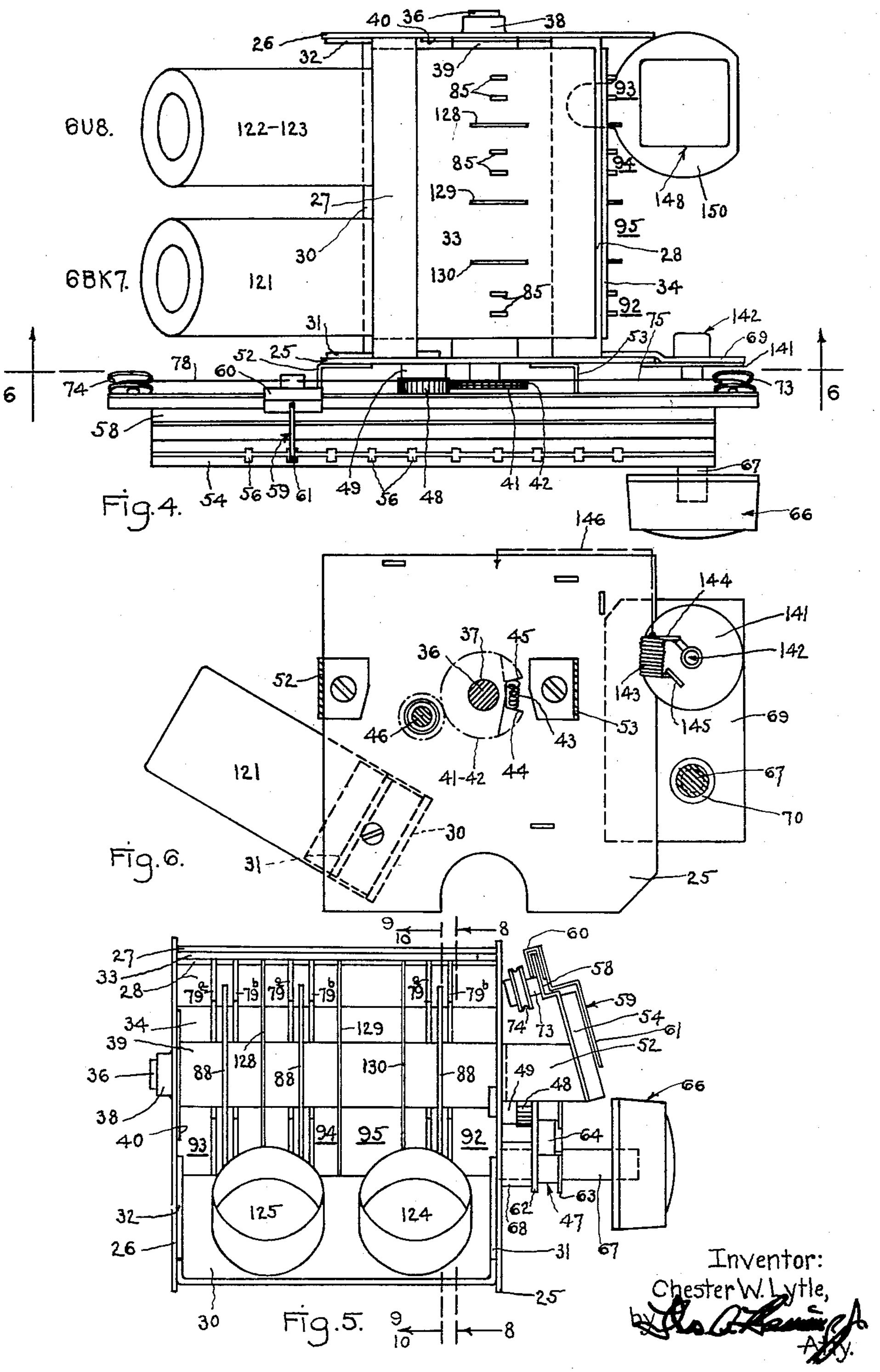
Figure 4 shows a top or plan view corresponding to Figures 1, 2 and 3.
Figure 5 shows a view similar to that of Figure 2, but with the tubes and their shields removed so as to better show the stator vanes and the rotor plates of the variable impedance elements of the three sections, together with the intervening shields.
Figure 6 shows a view taken substantially on the line 6—6 of Figure 4, and it shows the elevation with the scale and pointer elements cut away; and this view also shows the location of the antenna connection, etc.
Figure 7:
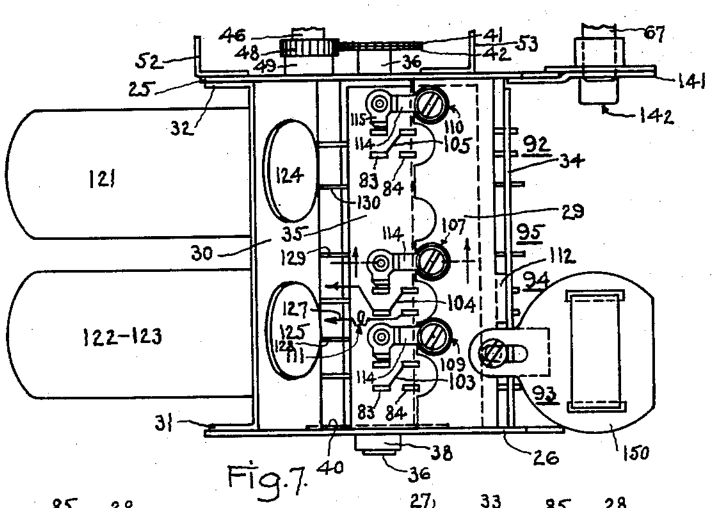
Figure 7 shows a bottom view corresponding to Figures 1, 2, 3 and 4; and this figure shows the locations of the small or trimming capacitors and the small inductance by which the trimming operations may be readily effected after assembly of the tuner.

As well shown in Figures 4 and 7, and also in Figure 6, the shaft projects forwardly of the front plate 31 far enough to receive the companion gear elements 41 and 42 which are set onto a reduced size front end section of the shaft, the gear 41 being staked or otherwise rigidly secured to the shaft, and the gear 42 being free to rock on the shaft, both gear elements being provided with an equal number of teeth. The shaft 36 makes less than a complete rotation during full tuning range (in fact somewhat less than 180 degrees), so it is not necessary to use the full circumferences of the gears for teeth. Both of these gears are notched or cut away, as well shown in Figure 6, in opposite directions, and the spring 43 is set between the radial shoulders 44 and 45 of the two gears. This spring thus exerts a continuous urge tending to rock the gears in the opposite directions.

A stud 46 is secured to the front plate 31 and projects forwardly therefrom. A wheel 47 which is preferably grooved as shown in Figures 1, 2, 3 and 5, has the pinion 48 secured to its back face, such wheel and pinion element being journalled on the stud 46, a spacer collar 49 being set onto the stud to bring the pinion and wheel into correct spacing forwardly of the front plate. The pinion 48 meshes with both of the gears 41 and 42, which gears are set onto the shaft 36 in such manner during original assembly that the notched or cut away portions of the gears will occupy substantially the central tooth position shown in Figure 6 when the rotors of the variable impedances have been brought to substantially their half-rocked positions. Thus, rock of the shaft in either direction to its extreme position of rock will not cause unmeshing of the pinion from either of the gears. During such rocks the spring 43 will retain opposite faces of the two gears in continuous mesh with the pinion, the spring being of sufficient strength to ensure this result even under maximum torque conditions, and for drive in either direction. It is also noted that the gear-pinion ratio is two-to-one so that the required half rotation (or less) of the shaft is secured by a single rotation (or less) of the pinion. That is to say, the pinion and the grooved wheel 47 may be rocked a full rotation for full tuning range, the shaft making a half rotation at the same time for the full tuning variations of the variable impedances. It is also seen that with the so-far described arrangement very exact controls are secured on the shaft since no back-lash effects may occur when the direction of tuning is reversed. This enables very accurate correspondence between the shaft positions (of rock) and the wheel positions (of rock), regardless of direction of approach to the desired scale reading position.

Figures 8, 9, 10, 11, 12, 13:
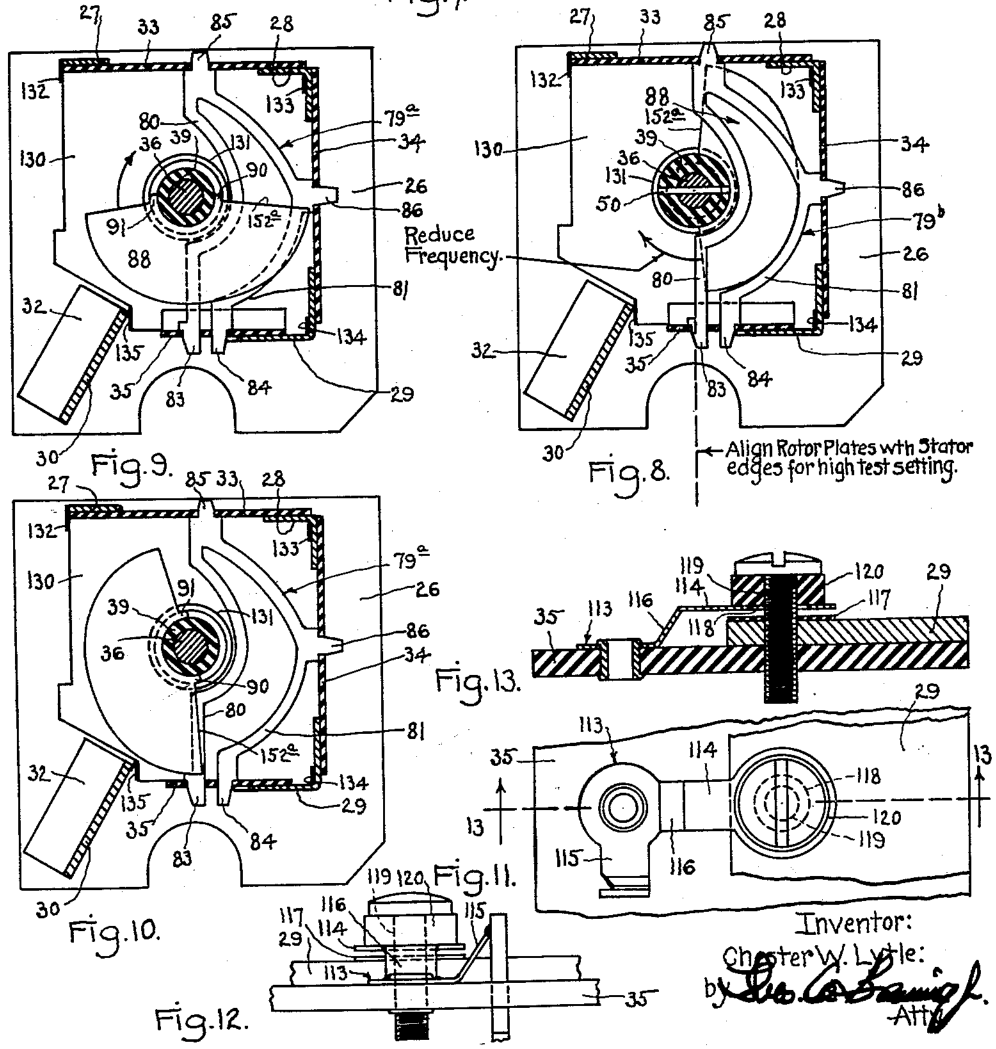
Figure 8 shows a cross-section taken on the line 8—8 of Figure 5, looking in the direction of the arrows; and this figure shows the form of the stator vanes, and the form of the rotor elements, the shaft being turned into its substantially fully meshed position for minimum inductance effect.
Figure 9 shows a cross-section taken on the line 9—9 of Figure 5, looking in the direction of the arrows; and this figure shows the rotor and shaft turned through substantially one half of their intended tuning range, being through substantially 90 degrees of rotation.
Figure 10 shows a view similar to that of Figure 9, but with the rotor and shaft turned further to almost their final position, for production of maximum inductance effect; and this figure is a cross-section taken on the line 10—10 of Figure 5, looking in the direction of the direction of the arrows, but with the rotor and shaft turned as above stated.
Figure 11 shows a fragmentary bottom view of the tuner at the location of one of the trimming capacitors, but on substantially three times full size.
Figure 12 shows a section taken on the line 12—12 of Figure 11, looking in the direction of the arrows, and is also a fragmentary section taken on the line 12—12 of Figure 7, looking in the direction of the arrows, but on enlarged scale.
Figure 13 shows a side elevation corresponding to Figure 11.

In order to secure the desired relation between the sleeve and gear positions (of the gears 41 and 42) I have shown the sleeve 39 as being secured to the shaft by the cross-pin 50 (see Figure 8). This pin is set into place after the parts have been assembled to the point at which correct registry of angular position of the sleeve with respect to the gears may be determined, the holes for accommodation of the pin 50 being drilled at that time, so as to then retain the sleeve and the gears in correct angular relationship. This matter will be explained more fully hereinafter, when the function of the sleeve has been further stated.

The wheel 47 is rotated back and forth to effect changes of the variable impedance elements. This means, and the scale and pointer elements and connections will now be described.

A plate 51 is secured to the front plate 31. This plate 51 carries the indicating scale, and also certain rollers and the pointer which travels over the scale. This plate 51 is conveniently provided with the two backwardly reaching lugs 52 and 53 which are formed backwardly from the lower central portion of the plate, and are provided with feet which set against the front plate 31 and are suitably secured thereto, as by screws shown in Figure 6. The body of the plate 51 is preferably formed so as to slant downwardly and forwardly, as evident from Figures 1, 2, 3, 4 and 5, and the scale plate 54 is secured to this slanting portion in convenient manner, as by the screws 55 shown in Figure 1. This scale plate is made of suitable material such as plastic, and is provided with markings 56 to indicate frequencies to be tuned. Adjacent to these markings 56 are the corresponding frequency designations 57. One important feature of the present invention resides in the provision of means and arrangements such that these scale plates (54) for quantities of tuners of like specifications may be produced in standardized form and markings, so that such scale plates may be made at low cost and in quantity production, all of the markings of a quantity of such scale plates being uniformly or equally formed on the plates; and the invention also includes the means whereby the frequencies actually tuned will correspond to the indicated designations on the scale plates.

The upper portion of the plate 51 is formed backwardly and upwardly to produce the upwardly extending flange 58, and the sliding pointed element 59 rides back and forth on this flange as a rail. This pointer element includes the small rider 60 in the form of an inverted U-shaped element, the pointer proper, 61, comprising a narrow strip of metal soldered or otherwise secured to this rider, and reaching down across the face of the scale plate 54. The back leg of the rider may be formed with one or two small lugs (not shown) by which the cords which control the rider's movements may be secured to the rider.

Figure 1:
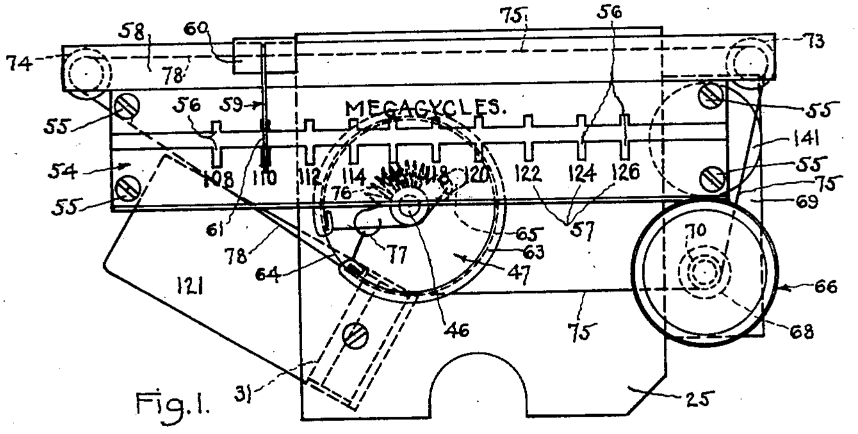
Figure 1 shows a front elevation of a tuner embodying the features of the present invention, on substantially full scale, the tuner illustrated being designed for tuning the range between substantially 108 and 126 megacycles.
Figure 2:
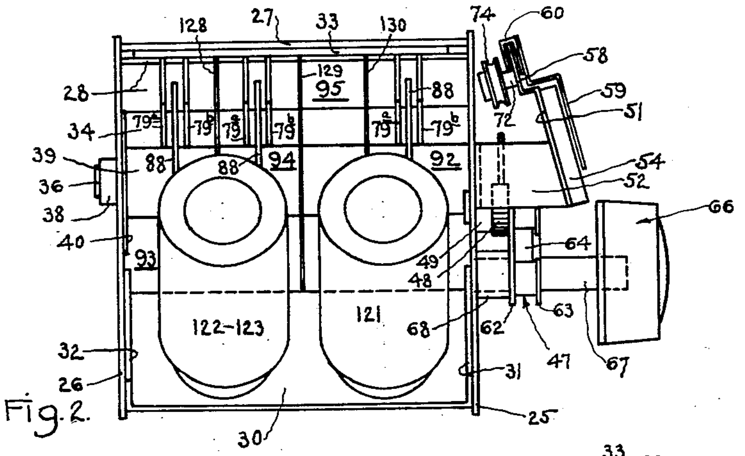
Figure 2 shows a left-hand side elevation corresponding to Figure 1.
Figure 3:
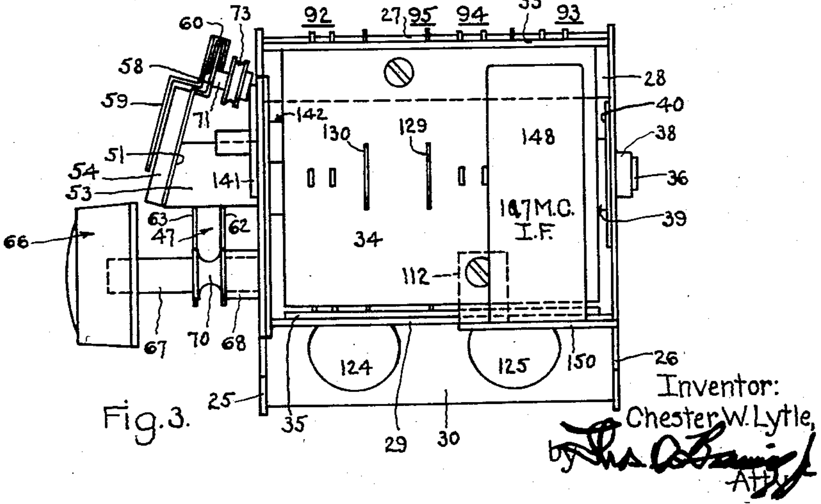
Figure 3 shows a right-hand side elevation corresponding to Figures 1 and 2.

The wheel 47 occupies a position between the lower portion of the plate 51 and the front plate 31, as shown in Figures 1, 2 and 5 in particular. This wheel is provided with peripheral flanges 62 and 63. These flanges and the peripheral portion of the wheel are cut away for a small arcuate segment, as shown at 64 in Figures 1 and 2. An ear 65 is formed forwardly from the back face of the wheel and provides an anchor to which tension members may be connected in order to establish connection thereof to the wheel.

A tuning button 66 is provided on the front end of the shaft 67 which shaft is journalled in a collar 68 secured to an extension plate 69 projecting rightwardly from the front plate 31. This shaft 67 is provided with the small grooved portion 70, best shown in Figure 3. To the right and left end portions of the flange 58 there are secured small studs, 71 and 72, on which are journalled the small pulleys 73 and 74 of grooved form. All of the parts just above described comprise portions of the means to effect back and forth movements of the pointer rider, and back and forth rocks of the wheel, with corresponding back and forth rocks of the shaft and its sleeve, 39. The following further arrangements are included in such movement controls:

Referring to Figure 1, a cord or tension member 75 has one end reaching through the cut-away portion of the wheel 47 and connected to a spring 76, or to the hook 77 on one end of that spring. This spring is wrapped part way around the hub of the wheel, and the other end of such spring is hooked to the wheel ear 65, thus establishing connection to the wheel itself. This cord 75 passes out through the cut-away portion of the wheel and then passes directly to the grooved portion 70 of the shaft 67, and makes one or two convolutions around such groove portion to ensure good driving engagement with the shaft. Thence said cord passes up and over the pulley 73 and horizontally to the rider 60, to which rider it is connected. Another cord or tension member 78 has one end connected to the ear 65 of the wheel. From such connection this cord passes over the wheel hub and out through the cut-away portion of the wheel, and makes one or more wraps around the periphery of the wheel. This cord then passes leftwardly to the pulley 74 and over that pulley to connection with the rider 60. With this arrangement it will be seen that rotations or rocks of the button or knob 66 will cause corresponding movements of the rider along the flange 58, and at the same time will cause rotations of the wheel 47 and the pinion 48, thus correspondingly rotating the shaft 36 and sleeve 39. It will also be seen that, by properly forming the connections between the cord ends where they connect to the rider, two effects or functions are secured. By properly tensioning the cords at the time of such attachments the spring 76 is placed under tension and stretch, so that the entire cord system is placed under such a tension as will ensure good drive from the shaft 67 to the various parts. This tension condition will be effectively maintained without regard to wear or such changes of dimension as may be due to variations of temperature, the spring 76 ensuring that this condition shall obtain.

The other effect or function of this arrangement is the following:

Provision is made for connecting the ends of the two cords to the rider, as by use of the lugs formed on the back portion of such rider. By bringing the cord ends to the locations of these lugs correctly, that is, so as to insure the production of the desired cord tensions under spring force, and also so as to properly relate the rider position to the rotated position of the wheel 47, it is possible to ensure that the back and forth rider movements will be properly harmonized and synchronized, and phased with respect to the rotary movements simultaneously produced in the shaft 36 and sleeve 39. I shall presently refer in particularity to the rotary movements of the rotors of the variable impedances; but here it may be mentioned that the total length of the scale 54 between its extreme frequency limits is made to correspond to the total change of actual frequency which occurs during rock of the rotors from one extreme position to the other extreme position (and I here refer to the extremes of calibration for which the tuner is intended). Such full rotor rock is slightly less than 180 degrees. Correspondingly, the full wheel rotation will be slightly less than 360 degrees (there being a two-to-one ratio in the geared connection). The peripheral size of the wheel is also such that for such wheel rotation the rider movement will equal the linear distance between the high and low frequency readings of the scale which correspond to the high and low actual frequencies tuned. When connecting the two cord ends to the rider (as by the use of the lugs referred to), slight adjustments of the two cords may be made during the process of making such connections, loosening one cord slightly and correspondingly drawing in the other cord by a like amount, while maintaining the cords under such tension that the spring 76 is properly stretched. Thus the relative positions of the rider and of the shaft and sleeve (rotated), may be secured so that each rider position will correspond to the proper angular position of the shaft and the sleeve 39. Once this relationship has been established it will be maintained and the cords will also be maintained under proper tension to ensure good functioning. In this connection it is noted that even if slip should occur between the cord 75 and the shaft 67 and button or knob 66, the relative positions of the rider and pointer with respect to the shaft rotation will not be changed. This possibility of slip is of advantage, since it ensures that, in case of attempted excessive rotation of the knob, when the parts have reached one extreme or the other of their movement, no damage will be done to any part of the system.

It should be here noted that the relative angular positions of the shaft 36 and the sleeve 39 are fixed by the cross-pin 50 to which reference has already been made. By adjusting this angular relation prior to drilling the cross hole for said pin it would be possible to bring the rotor plates carried by the sleeve, as well as the sleeve itself into correct relation to the position of the rider 60 along the rail 58, to thus secure the correct relationship of pointer position and rotor plate angle. However, the use of the cords 75 and 78 and adjustment of their connections to the rider is a preferred means to secure the desired result. Also, under this procedure the drilling of the cross hole may be effected with the sleeve and shaft at such relative positions of rotation that the cut-away portions of the gears 41 and 42 will always remain to the right of the pinion 48, even when the parts are moved to one extreme of movement or the other for extreme tuning adjustments. Then the adjustments to effect correct relation of the pointer (and rider) positions with respect to the rotor positions of the variable impedances may be secured by use of the cords and correct adjustments of their connections to the rider as already explained.

It is pointed out that the scale markings 56 are uniformly spaced, that is, for equal changes of frequency tuned the pointer moves equal increments along the scale. Since the rotors of the variable impedances are directly connected to the pointer—to the rider which carries the same—it follows that the variable impedances must also be of such design that they will cause equal changes of tuned frequency for equal angular movements. I shall now disclose how this feature is met and solved.

Figure 15:
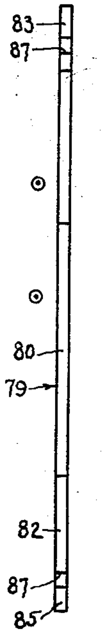
Figure 15 shows an edge view corresponding to Figure 14.
Figure 14:
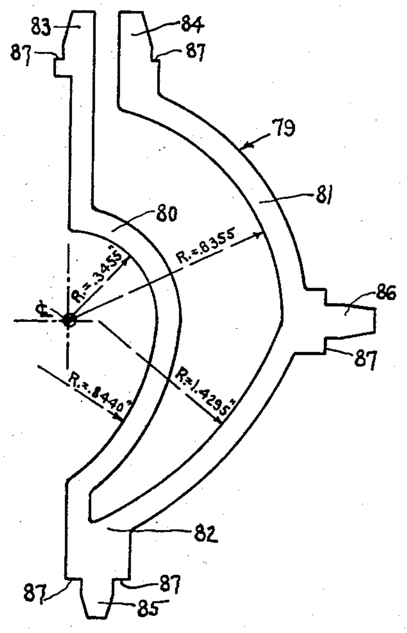
Figure 14 shows a face view of one of the stator vane elements, but on substantially double scale; and in this figure there are shown typical dimensions of the particular stator vane therein illustrated, to illustrate in detail the form of this particular vane, but without intention to limit the invention in any way, except as such limitations may be imposed by the claims to follow.
Figure 17:
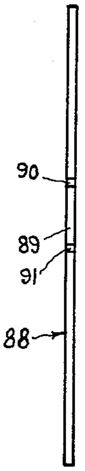
Figure 17 shows an edge view corresponding to Figure 16.

The variable impedances shown in the drawings are of the type in which variable inductances are used to control the tuned frequencies; and specifically, these variable inductances are of that type incorporating vane stators and rotatable rotors adjacent to but insulated from such stators. I do not intend to limit myself to this specific type except as I may do so in the claims to follow. In Figures 14 and 15 I have shown one stator vane on double scale, and in Figures 16 and 17 I have shown a companion rotor element, also on double scale. I have also in these figures shown the dimensions of one design of such elements which has been found to satisfactorily produce the objectives of this invention, but I do not intend to limit myself thereto, except as I may do so in the claims to follow.

Each stator vane, 79 includes the two curved arms 80 and 81 which are joined together at the point 82 to produce a generally U-shaped element. The free ends, 83 and 84 of these arms constitute the normally used terminals of the stator element; but it is here noted that by effecting connection to some other point or points of these arms the active inductive effect of the element may be made less than its total. For example, by connecting to one of the terminals 83 or 84 and to the central point 82, a less inductive effect may be readily secured. In Figures 14–15 and 16–17, as well as in Figure 18, which latter is a composite figure showing the relation which the rotor bears to one stator, the elements are actually shown upside down, and the direction of rotor rotation is reversed as compared to other figures.

The stator elements are accurately and fixedly mounted in the body of the tuner as follows:

The insulating plate 33 is provided with a slot to receive the prong 85 extending from the central point 82, the insulating plate 35 is provided with two adjacent slots to receive the prongs or terminals 83 and 84 of the two arms, and the insulating plate 34 is provided with a slot to receive the prong 86 reaching outwardly from the central portion of the arm 81. As the insulating plates are assembled into the frame of the tuner these prongs are inserted into the proper slots. Shoulders 87 are provided adjacent to the several prongs to contact against the inside faces of the insulating plates and thus exactly locate the stator arms with respect to the frame. It will be understood that the foregoing description of a stator is typical of all of the stators of the tuner.

Figure 16:
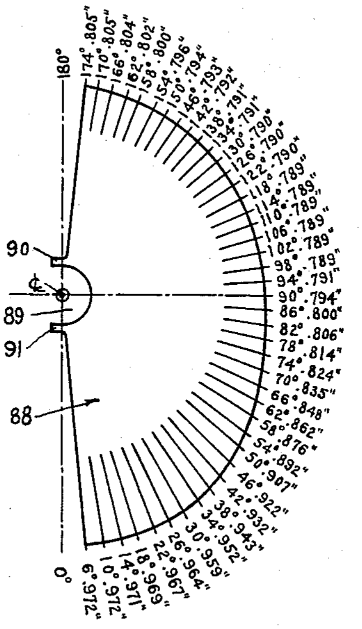
Figure 16 shows a face view of a typical rotor element corresponding to the stator of Figures 14 and 15, and on substantially double scale; and in this figure dimensions are also shown for a reason similar to that explained with respect to Figure 14, and without needless limitation, except as such limitations may be imposed by the claims to follow.

The rotor 88 is of generally semi-circular form, but its actual configuration departs materially from that of a semicircle, as shown in Figure 16. Furthermore, it is of slightly less arcuate embracement than 180 degrees, as shown in that figure. The central portion of this rotor is provided with an arcuate notch 89 of less diameter than the diameter of the insulating sleeve 39. The prongs 90 and 91 are provided at the sides of this notch, and since the rotor is made of metal, such as copper these prongs are readily bent slightly to lock the rotor to the insulating sleeve. Said sleeve is provided with encircling grooves, properly located along its length to correspond to the proper spacings of the rotors of the tuner; and these grooves are of depth to receive the inner edge portions of the rotors with snug fit. Upon setting a rotor with its notched portion into a groove of the sleeve, the prongs 90 and 91 may be clinched inwards slightly, thus effectively locking the rotor to the sleeve. At the same time each rotor is insulated from all other elements of the tuner, including the stators which it serves.

Figure 18:
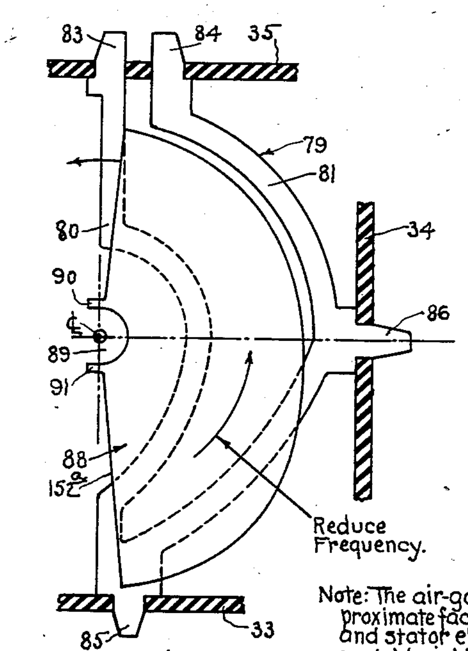
Figure 18 shows the relative forms of the stator vane and the companion rotor element of Figures 14 and 16, when these parts are assembled into the tuner, but upside down, and with the rotor in its substantially fully meshed position for producing a minimum induction effect of the stator.

The rotors are of course centered on the axis of rotation, the rotor center being shown in Figure 14; and the stators are so carried by the tuner frame that the center point shown in Figure 14 registers with the axis of rotation. When the parts are assembled the relative centerings of the rotor and stator are as shown in Figure 18, in which figure the rotor is fully meshed with a stator, or is at a point very close to such fully meshed position. Under such conditions the inductive effect of the stator is a minimum. Rotation of the rotor in the direction of the arrow in Figure 18 (counterclockwise in that figure, but actually clockwise in the assembled tuner) serves to progressively reduce the meshing effect. In Figures 8, 9 and 10 I have shown three progressive positions of the rotor, showing how the meshing progressively decreases with corresponding progressive increase of the inductive effect of the stator.

The illustrated tuner includes three sections, shown on the wiring diagram of Figure 20 as 92, 93 and 94, respectively. These sections are as follows: section 92 is the R.F. amplifier section, section 93 is the mixer section, and section 94 is the oscillator section. These sections are shown in Figures 2 and 5 by like numberings for ready identification. Each of these sections includes, as an important element of its circuit arrangements, a variable inductance of the type which I have been describing above. Examination of Figures 2 and 5 will show that there is provided a blank section space, 95, between the two sections 92 and 93, so that the elements of these sections are materially separated from each other. This is done to reduce possible cross-coupling between these sections, other means to reduce such cross-coupling effects also being provided, as will presently appear. Examination of these figures will also show that I have provided two stator elements, numbered as 79[a] and 79[b] for each of these sections; and will also show that a single rotor element 88 serves both stators of each section, being placed centrally between them. By properly locating the grooves of the sleeve 39 along the length of that sleeve, in respect to the spacings between the stators as determined by the slots for their prongs, already referred to, all of the rotors will be correctly spaced with respect to the length of the tuner unit, front to back, but it may happen that each rotor is slightly off center with respect to the central plane between the stators which it serves. In such a case such off-centering will be the same for all of the variable inductances. To rectify such a condition, use may be made of the thin shim 40, already referred to, to set the entire shaft assembly slightly endwise with respect to the tuner frame.

In Figure 20 the three variable inductances are designated by the numerals 96, 97 and 98, respectively, and the broken lines 99, 100, 101 and 102 indicate the connections of the rotors of these inductances together by the sleeve 39. The rotation of the shaft thus tunes all of these inductances simultaneously. All of these inductances are alike, and all serve to produce equal inductive effects when their stators are influenced by their rotors at all rotated positions of the shaft and the sleeve. Examination of Figure 7 shows that the prong 84 of one stator element of each section is connected to the prong 83 of the companion stator element of such section, these connections being made by the short leads 103, 104 and 105, for the sections 93, 94 and 95, respectively. These connections serve to place both stator elements of each section in series connection with each other, thus doubling the inductive effect of the variable impedance for such section. Still the inductive effects of the variable inductances for all three sections are always the same, for all rotated positions of the shaft, disregarding slight tolerances in manufacture and assembly of the parts. These slight tolerances may, however, serve to produce material errors of tuning effects, which will reflect as errors in the actual tuned frequencies for various pointer positions on the scale.

Across the variable inductance 98 of the section 94 is connected the capacitor including the fixed element 106, and the shop or factory adjustable element 107, across the variable inductance 97 of the section 93 is connected the capacitor including the fixed element 108, and the shop or factory adjustable element 109, and across the variable inductance 96 of the section 92 is connected the capacitor element 110 which is a shop or factory adjustable element. These capacitor elements are for production of the intended frequencies for various adjusted positions of the several variable inductances. The use and operation of the shop or factory adjustable capacitors above referred to will be explained hereinafter.

The variable inductances shown in detail in Figures 14 to 18, inclusive, and in less detail elsewhere, have been designed to produce equal changes of tuned frequency for equal increments of angular movement of the rotors, under the circuit conditions of the tuner, and generally within the range of 108 to 126 megacycles, or thereabouts. To this end I have shown in Figure 20 the actual frequency values of a typical circuit wherein the variable inductances detailed herein are used. The inductance values of the variable inductances 96, 97 and 98 are not shown in Figure 20, but it may be stated that the air gaps between the rotors and stators of these inductances are substantially .03575 inch. From this dimension, together with the stator and rotor specifications as shown in Figures 14, 15, 16 and 17 it is possible to estimate the inductances which will be possible for various angular embracements of said inductance rotors.

It should be stated, however, that close calculation of inductance values for such variable inductances as are shown in the figures is difficult due to the many variables presented in the problem. Other factors, such as the presence of other elements within influencing distance affect the actual inductance results produced; and a further factor which is difficult of close calculation is that introduced by self-capacitance of the elements of the variable inductance itself. For the above reasons and others the physical specifications of the stators and the rotor shown in Figures 14, 15, 16 and 17 represent the results of much experimentation and laboratory testing, under the desired circuit conditions, to produce variations of the actual tuned frequency according to the desired lineal conditions; that is, to produce equal changes of actual tuned frequency for equal increments of pointer movement, so that an evenly spaced scale may be used for showing the actual tuned frequencies. These results I have secured to a high degree of accuracy in the tuner construction herein illustrated and described.

Having produced the desired variable inductance which will enable securing the foregoing results in the intended circuit arrangements, and through the desired range of actual tuned frequencies, and upon assembling the elements into the complete hegemony, it will nevertheless be found that slight inaccuracies will appear such that the pointer indications on the scale will not exactly truly show the actual tuned frequencies. Such inaccuracies will generally present themselves as a result of manufacturing or shop tolerances necessarily involved in the production of the instruments. I have, in the preamble to this case, stated generally how these inaccuracies will affect the lack of coordination between the pointer indications and the actual tuned frequencies, and generally how such inaccuracies may be corrected or compensated for. I shall now disclose in detail such means, and shall also show, by way of illustration only, one set of operational adjustments of the elements whereby these inaccuracies may be substantially eliminated.

The factory or shop adjustable capacitances 107, 109 and 110 shown in the wiring diagram of Figure 20 are of very small capacitance values, so that very minute corrections of circuit characteristics may be made by them. Also, the physical connections of these elements to other portions of the circuit are very short and direct so that undesired electrical effects at very high frequencies may be substantially avoided. A typical construction of one of these elements is shown in detail in Figures 11, 12 and 13, and will be described presently.

There is also shown in said wiring diagram a small adjustable inductance 111 in direct series with the variable inductance element 98, so that the inductance elements determining the resonant frequencies of the oscillator circuit may be slightly adjusted by means other than the normally used variable inductance 98. This element 111 is a factory or shop adjustable inductance. This element is shown in Figure 7 and will be further described hereinafter. At this point it should be mentioned that this adjustable inductance 111 is self-contained and removed from the variable inductance element 98. Therefore the total inductance produced by the two elements 98 and 111 is simply the additive effect of the two; there is produced no mutual inductance effect between the two, so the adjustment of the element 111 may be effected entirely without changing the inductance effect of the element 98. This fact is of importance.

Referring to Figure 7 which shows a bottom face view of the tuner, it will be seen that the horizontal arm of the element 29 comprises a rather broad plate. This is a padder plate and is well grounded. The other arm of the angle, as shown, comprises a lug 112 (see Figure 3) to which the lower portion of the insulating sheet 34 is connected. Various of the connections are made to this padder plate. Examination of Figure 20 shows that one side of each of the small adjustable capacitors 107, 109 and 110 is grounded. This may be done by use of the padder plate as the ground side of these capacitors. Figures 11, 12 and 13 show the details of construction of one of these capacitors on much enlarged scale. An L-shaped unit, 113 is formed of light, springy metal, including the arms 114 and 115 at right angles to each other. The elbow of this unit is riveted to the insulating plate 35 at a point rather close to the prong 83 of the appropriate stator element. The arm 114 is formed upwardly at the point 116 so that the terminal, flat portion of this arm overlies the padder plate; but the said arm is so biased by its spring action that it normally stands some distance above the surface of the padder plate to produce an air-gap of substantial thickness. A thin plate of mica or other suitable dielectric, 117 is set in this air-gap. The arm 114 is provided with a hole 118 of considerable size, and a tap screw 119 is set down through the arm 114 and through this hole 118, and through the dielectric, and into the padder plate, to which latter it is threaded. By adjustment of this screw 119 the arm 114 may be drawn down to adjusted position with respect to the padder plate, or even into contact with the dielectric, in which latter case the degree of pressure which the arm 114 will exert on the dielectric may also be adjusted. This screw is so threaded into the padder plate that it passes centrally through the hole 118 of the arm 114, so that ample air-gap is produced at this point. Also, a washer, 120 of insulating material is set onto the screw between the screw head and the arm 114 so as to effectively prevent electrical contact of the screw with the arm at that point. This washer is of considerable thickness so that a large air-gap is produced between the screw head and the top face of the arm 114. Thus, all portions of the screw are separated considerable distances from the arm 114, so that capacitor effects to the screw are of very small value (such effects being inversely as the square of the distance between the capacitor elements); and these separations are very large as compared to the intended air-gap at the location of the dielectric element 117. In Figure 13 the arm is shown separated from the dielectric a considerable distance, which is there much exaggerated.

The other arm, 115, of the element 113, has its end portion upturned, as shown in Figure 12, and soldered or otherwise effectively connected to the prong 83. Under these conditions, and by comparison of Figures 11, 12 and 13 with the wiring diagram of Figure 20 it will be evident that these small adjustable capacitors are connected by very short electrical connections to both the corresponding variable inductance and the padder plate ground, and also that minute adjustments of capacitance may be readily made by very simple operations, the screws 119 being provided with very small pitch threads. Also, that these adjustments will remain definitely and firmly fixed at the intended capacitance values, since the screws may be rather tightly fitted into the padder plate. Also, all of these minute capacitor adjustments may be readily effected after the tuner has been completely assembled, and without need of affecting or dismantling other tuner elements.

Examination of Figure 20 also shows the R.F. amplifier tube, 121, which is shown as a 6BK7 tube, and the mixer tube element 122, which is shown as ½ of a 6U8 tube, and the oscillator tube element 123, which is shown as the other ½ of the 6U8 tube. The socket mountings for these two tubes are shown as mounted on the bar 30, and are designated as 124, for the tube 121, and 125, for the tube 122—123. These two sockets are thus brought close to the prongs of the stator elements of the variable impedance elements, and to other circuit elements. Examination of Figure 20 also shows that the adjustable inductance element 111 previously referred to, is connected between the variable inductance 98 and the plate 126 of the tube element 123. Examination of Figure 7 shows that this adjustable inductance 111 is formed in the short lead 127 connecting the prong of the proper stator element to that contact of the socket mounting 125 which connects to the tube plate when the tube is in place. This minute adjustable inductance comprises only one or two turns of that lead 127, such turns being formed in said lead at the time of installation, if desired. The inductance produced by these turns may be readily adjusted by minute amounts by either slightly spreading these turns apart (to reduce the inductance) or by compressing these turns slightly together (to increase the inductance). Such slight adjustments are very readily effected after the tuner has been completely assembled, and without affecting other adjustments or elements of the tuner.

Examination of Figures 2 and 5 shows the presence of the shield plates 128, 129 and 130 located between the sections 93, 94 and 92, the shield 128 being located between the sections 93 and 94, and the shields 129 and 130 being located between the sections 94 and 92. These shields 129 and 130 are located at the sides of the vacant section 95. Each of these shields is of generally rectangular shape as shown in Figures 8, 9 and 10. Each of these plates is provided with a central hole 131 of sufficient size to freely accommodate the insulating sleeve 39, as shown in said figures. Each of these shields is electrically connected to the bar 27, to the angle 28, to the angle 29, and to the bar 30, as shown by the soldering connections 132, 133, 134 and 135. Since all these angles and bars are electrically connected at their ends by the end plates 31 and 32 it follows that each shield is also well grounded at each of its corners. Examination of Figures 8, 9 and 10 also shows that each of these shields is of size such that effective shielding is produced for all rotated positions of the rotor plates. These shields are for reduction of the cross-coupling between the sections 93, 94 and 92, as already mentioned.

Examination of Figure 20 shows that connections are indicated to the stator elements of the variable inductances 96 and 98 at points between the terminals of said stators. The antenna terminals 136 and 137 come to the stator of the variable inductance 96 at the point 138, and the lead 139 comes to the stator of the inductance 98 at the point 140. Since these stators are of the forms shown in various figures already described, it is evident that it is desirable to make provision for effecting these connections to the points 138 and 140 in simple manner. These points of connection are established by empirical test to secure the best matching of the several sections, but since such matching may generally be effected by rather rough adjustments of these points of connection, it is found that said connections may be effected to one or another of the prongs 83, 84, 85 or 86; and since each variable inductance includes two such stators, the number of possible points from which selection for connection may be made is doubled.

The antenna connection is effected to the section 92 located at the front of the tuner. Examination of Figures 1, 4 and 5 shows the insulating plate 141 secured to the front plate extension 69 near the top thereof. This plate extension 69 and insulating plate 141 are provided with registering holes through which reach the thimbled opening 142. The antenna line is brought through this opening 142 to the front of the tuner. An inductance 143, shown in Figure 6 and in the wiring diagram of Figure 20, is supported just in advance of the insulating plate. One end of this inductance is connected directly to the antenna at the point 144, and the other end is connected to the lug 145 which reaches through the insulating plate 141 and is grounded to the front plate extension 69. A lead 146 extends directly from the antenna connection point 144 up and over the front plate 31 to connection to the prong 85 of one of the stator elements of the variable inductance 96 of the section 92, and a small capacitor 147 (not shown) is included in this connection. It will be seen that by this arrangement the incoming antenna connections are very short and direct, but readily effected.

In Figure 20 there is shown the unit 148 for delivery of the intermediate frequency (shown as 10.7 mc.) to the Automatic Gain Control lead 149. This unit 148 is conveniently carried by a small plate extension 150 secured to the plate 29 and projecting outwardly beyond the insulating plate 34. This plate 150 is located opposite to the section 93 which is located at the rear portion of the tuner. This unit 148 is connected to the tube 122—123 which is also located at the rear portion of the tuner. Accordingly the leads between such tube and this unit 148 may be short and direct.

Having assembled the tuner elements embodying the features hereinbefore explained the tuner may be tested to determine any discrepancies between actually tuned frequencies when the pointer is set to various scale readings, and the said readings. Although the elements have been designed to secure correct readings corresponding to the actual tuned frequencies it will generally happen that such discrepancies will be found. Such discrepancies will either be in the nature of an offsetting of all readings to higher or lower values than the true actual frequencies by equal amounts throughout the complete range of the tests, or will be in the nature of a regularly increasing or decreasing error as the tuned frequency is regularly varied in one direction. In the former case the "band spread" will be the same as the band spread indicated by the scale readings, but with offsetting of all readings by a uniform amount. In the latter case the "band spread" will be either greater than or less than the band spread of the readings indicated by the changes of location of the pointer on the scale, over the tested range.

The corrections in the case of any discrepancy are to be made by use of the elements 107, 109, 110, and 111. I shall now explain a typical set of operations to secure these corrections, as follows:

Referring to Figure 19, I have therein shown by curves a number of test relations between "pulley rotation" (being a factor which is directly related to the pointer position), and "tuning frequency" being the actually tuned frequencies. The line 151, designated "ideal calibration," shows the variation of actually tuned frequency with pointer position, for correct and perfect calibration. It is desired to bring the actually tuned frequencies into register with this line. The following procedure may be used to secure this result:

Having determined that when the pointer is brought to the desired high reading position (for example 126 mc.) for which the tuner is designed, the rotors of the variable inductances should stand at a known low inductance position. This may be, for example, that condition wherein the edge $152^a$ of each rotor plate aligns with the left-hand edge of the stator arms (being a position slightly counterclockwise of the position shown in Figure 8). In case of discrepancy being found in this test the proper corrections may be made by readjusting the connections of the cords 75 and 78 with the rider 60. Next the shaft will be rotated to carry the pointer to the intended low reading position on the scale, for example, 108 mc. The frequency now being actually tuned will be determined. In Figure 19 I have shown this tested frequency as higher than the scale reading, being shown as 110 mc. The line 152 indicates the relation of scale reading to actually tuned frequency during the run from the first, high reading position, to this test position. This determined low scale reading frequency (110) is shown by the point 153. The oscillator capacitor 107 may now be adjusted to bring the actually tuned frequency to the low scale reading (assumed at 108 mc. in the above statement). This result is secured by increasing the capacity value of said capacitor element 107. This element is shown on Figure 7 and comprises one of the minute and screw adjusted capacitors shown in detail in Figures 11, 12 and 13. This adjustment will bring the actually tuned frequency to the point 154. The effect of this correction will be to slightly reduce the "band spread," thus reducing the slant of the characteristic curve of the now adjusted tuner.

The pointer should next be restored to its high reading position (126 mc.), and the actually tuned frequency shall then be determined at this pointer position. If that actually tuned frequency is higher than 126, as shown by the point 155 on Figure 19, further correction will be required. In running the pointer to this high reading position as just explained the actually tuned frequency has followed the line 156 in Figure 19. Correction should now be made to reduce the actually tuned frequency to the vaue of 126 mc. This may be done by raising the inductance of the oscillator section. Such effect may be secured by slightly collapsing the convolutions of the small inductance element 111 until the desired result is secured. This operation will again slightly reduce the band spread so that the slant of the characteristic curve will be further slightly lowered. By this new adjustment the actually tuned frequency has been brought to the point 157, in Figure 19.

The pointer may now be run back to its intended low reading position (108 mc.). Test will now be made to determine the actually tuned frequency. Assuming that such frequency is too low, less than 108 mc., as shown in Figure 19, correction should be made to raise such frequency slightly. During the run to the point 158, which is the too low frequency test point just referred to, the characteristic line 159 has been traversed. This line is of slightly less slant than the previous line 156. Correction may now be made to slightly raise the actually tuned frequency with the pointer in its low reading position. Such correction may be effected by slightly increasing the capacitance of the minute capacitor 107, or by slightly reducing the inductance of the small inductance element 111, or by a combination of these two operations.

The above correction will restore the actually tuned frequency (for the condition of pointer reading, 108 mc.), back to the point 154 in Figure 19. The pointer may now be again run to the desired high position (126 mc.). Test may now be made to determine the actually tuned frequency. If it is too high it may appear as the point 160 in Figure 19. The characteristic line during this run will be as shown at 161. Correction may now be effected by slightly increasing the inductance of the small inductance element 111, if the previous correction consisted in the use of the minute capacitor 107.

Of course if during any of the tests above referred to it should be found that reverse correction should be made, proper account of such fact should be considered in making the corrections.

The above set of corrections is given merely by way of illustration, and to show that it is thus possible to bring the actually tuned frequencies into harmony with the pointer indications for the entire range of the tuner.

During the above corrections it is noted that the only minute capacitors referred to and used have been that for the oscillator, capacitor 107. The minute capacitors 109 and 110 may be used if need be, to secure better matching of the several sections either during the testing and correcting of the oscillator section, or afterwards. The primary corrections are, however, made in the oscillator section.

Although the stator and rotor elements shown in detail in Figures 14, 15, 16, 17 and 18 are designed, after extensive empirical tests, to produce equal variations of tuned frequency for equal increments of rotor movement, in the intended circuits, it may be found, upon assembly of the tuner, that there are actually slight departures from this ideal condition. Such slight departures from true lineality may be corrected after assembly of the tuner as follows:

Both of the stator arms 80 and 81 of each element are rigidly supported by the prongs 83, 84, 85 and 86. It is therefore possible to effect slight changes of air-gaps between these stators and the rotor by which they are influenced by slightly bending one or both of the stator vanes at points between the prongs, so as to effect very slight changes of the air-gaps. These corrections may be made at such portions of the stator vanes as will restore the condition of lineality of tuning which is desired. Slight inequalities in the spacing of each rotor between the two stator vanes which it serves will generally not affect the overall tuning quality since a slight excess of air-gap on one side of the rotor, with corresponding decrease of inductive effect on that side, will be largely balanced by a corresponding slight deficiency of air-gap on the other side of such rotor, with corresponding increase of inductive effect on that side. Since both of the stators are generally used in series with each other these departures from idealism will substantially correct each other.

Although I have herein shown a tuner which is provided with a single rotor and a corresponding pair of stator vanes for each section, still it will be understood that when needed, for production of some other range of tuning or otherwise, a greater number of rotors may be used for one or more of the sections, each provided with its stator vanes, and with the stator vanes connected in suitable electrical grouping, either series or parallel as required by the circuit arrangements.

In Figure 21 I have shown more or less schematically, a detail portion of the wiring diagram of the tuner, the elements shown in Figure 21 being partially supplemental to those shown in Figure 20. This supplemental showing of Figure 21 has to do especially with the circuit elements directly related to the filaments of the tubes 121, and 122—123. In Figure 21 these filaments are designated as 162 and 163, respectively, for said two tubes. One important feature of the arrangements shown in Figure 21 relates to the provision of arrangements whereby high amplification is possible, together with great stability of the tuner due to the use of special means interposed between the tube filaments and other provisions.

In the showing of Figure 21 one end of the filament 162 is grounded by the lead 164, and the other filament terminal is grounded by the lead 165 through the capacitor 166. One terminal of the filament 163 is supplied with D.C. supply over the line 167 and through the choke 168. This terminal of the filament 163 is grounded by the lead 169 through the capacitor 170; and the other terminal of this filament 163 is also grounded by the lead 171 through the capacitor 172. The two filament terminals or leads 165 and 171 therefrom, are connected together by the choke 173 and leads 174 and 175. With this arrangement of filament current supply I have found that it is possible to obtain very high amplification, together with great stability of the circuits, even when operating at high frequencies such as I have hereinbefore referred to.

I wish to point out that the constructions herein illustrated and described are such that the tuner is well able to withstand serious vibrations and other physical disturbances without throwing the tuner out of calibration, so that the reliability of the tuner to tune to the exact frequencies shown by pointer indications on the scale is very great. This reliability is maintained even after extensive use of the tuner under very onerous conditions of use, such as exist in various military and aircraft installations.

The tuner circuit herein shown may be designated as a cascade circuit, but the arrangements disclosed are such that said circuit and amplifier and the tuner, will maintain the stability and reliability above mentioned to an exceptional degree.

I claim:

1. A tuner having a radio frequency amplifier section including circuit elements, a mixer section including circuit elements, and an oscillator section including circuit elements, said tuner also including a frequency indicating scale and an indicating pointer and means to support said pointer for movement with respect to said scale, the circuit elements of each section including circuit frequency tuning elements and the frequency tuning elements of each section including a variable inductance unit for such section, and each such variable inductance unit including a stator element comprising a portion of the frequency tuning elements of such section and also including a rotor element relatively movable with respect to such stator element, gang rotor moving means in connection with the movable rotor elements of the variable inductance units, the stator and rotor elements of all of the said variable inductance units of the sections being of such forms and being so proportioned with respect to each other that substantially equal increments of movement of the gang rotor moving means produce substantially equal increments of change of the tuned frequency of the oscillator section, the indicating scale including tuned frequency designating markings which are progressively spaced along said scale with equal increments of indicated tuned frequency spaced at substantially equal scale spacings from each other, operative connections between the gang rotor moving means and the pointer, said operating connections including means to move the pointer to successive scale markings designating frequencies to be tuned at the rotated positions of the rotor elements corresponding to registry of the pointer with such scale markings, together with means to adjust the band width of the actual tuned frequencies embraced between positions of the inductance rotor elements corresponding to registry of the pointer with high and low scale markings to cause said band width to be equal to the indicated band width embraced between said high and low frequency scale markings, and to bring the high and low tuned frequencies of such actually tuned band width to values equal to the high and low scale readings aforesaid, said means comprising an adjustable capacitor in series connection with one end of the stator element of the variable inductance unit of the oscillator section and an adjustable inductance in series connection with the other end of said stator element, said adjustable capacitor and said adjustable inductance being of small impedance values in comparison to the change of the inductance value of the variable inductance unit for amounts of movement of the gang rotor moving means corresponding to movements of the pointer between said high and low scale markings.

2. A tuner as defined in claim 1 wherein the adjustable inductance which is of small inductance value in comparison to the inductance value of the variable inductance unit comprises an air core helix including at least one turn portion of conductor helix which is of adjustable form and location with respect to other turn portions of said inductance.

3. A tuner as defined in claim 1 wherein the adjustable capacitor which is of small impedance value in comparison to the impedance value of the variable inductance unit comprises a fixed plate, a flexible plate insulated from said fixed plate, and means to adjust the separation between said fixed plate and said flexible plate, together with a connection between the flexible plate and the stator element of the variable inductance unit.

References Cited in the file of this patent

UNITED STATES PATENTS

| | | |
|---|---|---|
| 1,895,247 | Jelen | Jan. 24, 1933 |
| 2,009,070 | Rechnitzer | July 23, 1935 |
| 2,143,658 | Morris et al. | Jan. 10, 1939 |
| 2,341,345 | Van Billiard | Feb. 8, 1944 |
| 2,366,750 | Pray | Jan. 9, 1945 |
| 2,408,895 | Turner | Oct. 8, 1946 |
| 2,475,637 | Vladimir | July 12, 1949 |
| 2,486,986 | Sands | Nov. 1, 1949 |
| 2,521,963 | Beusman | Sept. 12, 1950 |
| 2,590,864 | Johnson | Apr. 1, 1952 |
| 2,604,869 | Depweg | July 29, 1952 |

FOREIGN PATENTS

| | | |
|---|---|---|
| 542,395 | Great Britain | Jan. 7, 1942 |